W. C. NIBLETT & C. BRONK.
Machine for Upsetting Tires.

No. 224,105.                     Patented Feb. 3, 1880.

Witnesses:
A. B. Robertson
W. W. Hollingsworth

Inventors:
William C. Niblett
Charles Bronk
Per T. J. W. Robertson,
Associate Attorney

UNITED STATES PATENT OFFICE.

WILLIAM C. NIBLETT AND CHARLES BRONK, OF HUDSON, NEW YORK.

MACHINE FOR UPSETTING TIRES.

SPECIFICATION forming part of Letters Patent No. 224,105, dated February 3, 1880.

Application filed July 22, 1879.

*To all whom it may concern:*

Be it known that we, WILLIAM C. NIBLETT and CHARLES BRONK, of the city of Hudson, in the county of Columbia and State of New York, have invented certain new and useful Improvements in Tire-Upsetting Machines; and we do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
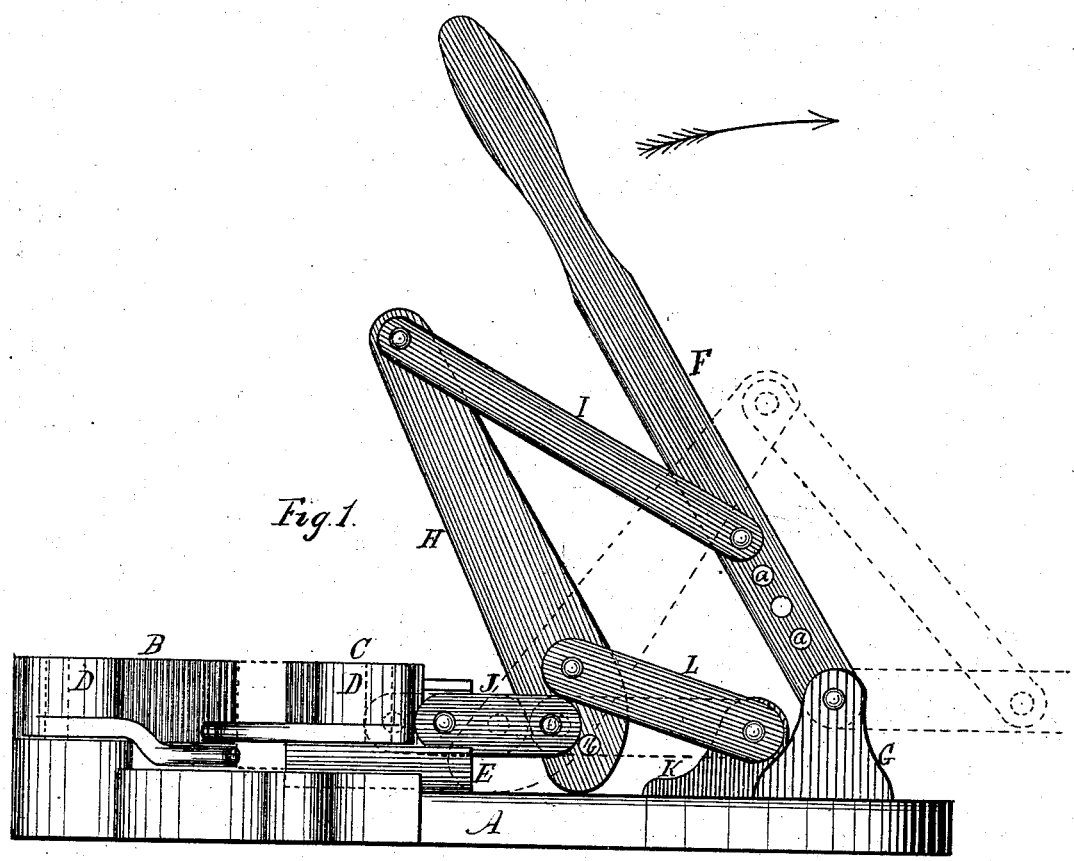
Figure 2:
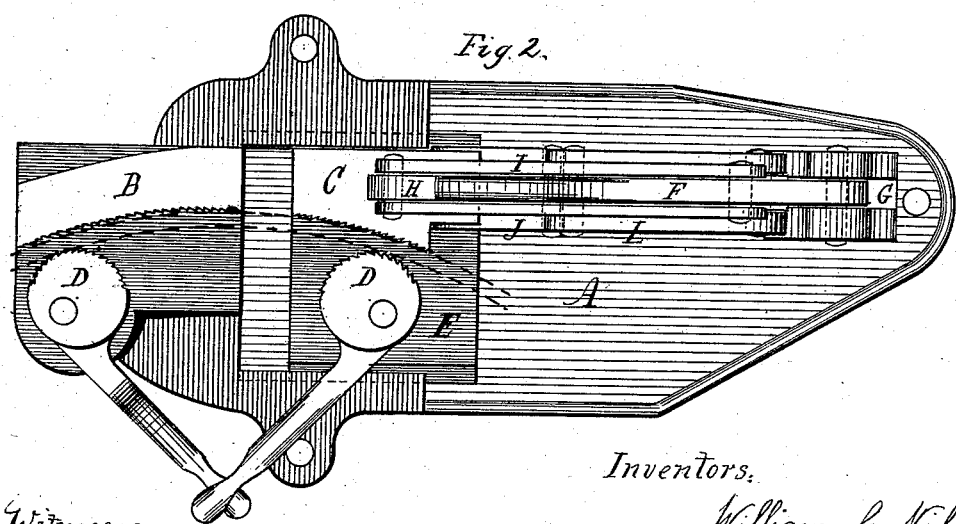

Figure 1 is a side view of a tire-upsetter constructed according to our invention, and Fig. 2 a plan thereof.

This invention relates to that class of tire-upsetters in which one of the jaws holding the tire is moved by a system of levers and links.

It consists, more especially, in such an arrangement of a hand-lever, a multiplying power-lever, and links connecting the multiplying-lever with the movable jaw and base that the links and lever form a kind of toggle-joint, the whole being so arranged that the links and base form a support for the multiplying power-lever, whereby the pivots connecting the links to said multiplying power-lever can be brought closer together, and the power thus increased.

In the drawings, A represents the base of the machine, provided with a fixed jaw, B, and a movable one, C, both of which are provided with cam-holders D D to secure the tire in position.

The movable jaw C is attached to a slide, E, working in dovetail guides in the base. At the opposite end of the base is a hand-lever, F, having its fulcrum in the block G attached to or forming part of the base, which lever is connected to the upper end of the power-lever H by a link or links, I. The lower end of the power-lever is connected to the jaw C by the links J, and to the block K, attached to or forming part of the block G and base A, by a third set of links, L. In the drawings all the links are shown double; but it is obvious that a single link with open joints may be used instead.

The operation is as follows: The tire having been inserted in the jaws B C and securely fastened by the holders D D, the hand-lever F is turned over in the direction indicated by the arrow until it assumes the position shown by the dotted lines, when it will be found that the links J J and L L are in a straight line, and the movable jaw is thus securely locked in the closed position.

The hand-lever F is provided with several holes, so that the power may be increased by putting the bolt connecting the links I I with the lever in one of the holes $a\,a$, so as to be nearer the fulcrum or block G. If it is desirable to open the jaws wider, the bolt securing the links J should be removed and the links attached to the lever by placing the bolt in the hole $b$, in which case the jaws would be moved farther back, and would travel with greater speed; but by this construction the links could not be brought in line, and hence the movable jaw would require some device to fasten it should it be desirable to hold it in a closed position.

If found desirable, a roller may be placed at the bottom of the lever H to prevent friction on the base.

The pivots connecting the multiplying-lever to the links can be brought as near together as desired, because of the absence of the fulcrum for the lever, which has been heretofore used with this class of lever-powers; and the power of this device can therefore be much increased over the system where a fulcrum for the lever is employed.

We are enabled to dispense with the fulcrum and standard for the lever by arranging our multiplying-lever so that it will vibrate laterally and in such a manner that the links and bottom of the base form its guides, as its weight and that of the links will usually keep the lower end of the lever in contact with the base.

By the arrangement and construction of parts herein shown and described a tire-upsetting machine can be made that is very durable, cheap in construction, easy in operation, and one that has the advantage of being capable of holding the jaws closed, combined with the great power incidental to the use of the power-lever H, acting in combination with the toggle-joint.

We are aware that a system of levers and links somewhat similar to ours has been employed in punching-machines; but the arrangement of the parts in our tire-upsetter is essentially different, and possesses important advantages over the punching-machines referred to.

We are also aware that toggle joints and levers have been employed in tire-upsetters.

What we claim as new is—

The combination, in a tire-upsetter, of the hand-lever F and links I with the laterally-vibrating power-lever H, having its lower end connected, substantially as described, to the base and jaw, the whole arranged to operate as set forth.

In testimony that we claim the foregoing as our own we affix our signatures in presence of two witnesses.

WILLIAM C. NIBLETT.
CHARLES BRONK.

Witnesses:
 WM. BROWN,
 SEWARD WATTLES.